(12) United States Patent
Lin et al.

(10) Patent No.: US 12,459,408 B2
(45) Date of Patent: Nov. 4, 2025

(54) SHOCK ABSORBING STRUCTURE OF AN ALL TERRAIN VEHICLE SEAT

(71) Applicants: Weiwei Lin, Taizhou (CN); Dongdong Chen, Taizhou (CN); Mengda Yang, Taizhou (CN)

(72) Inventors: Weiwei Lin, Taizhou (CN); Dongdong Chen, Taizhou (CN); Mengda Yang, Taizhou (CN)

(73) Assignee: Zhejiang Qianlang Motorcycle Co., Ltd., Taizhou (CN)

( * ) Notice: Subject to any disclaimer, the term of this patent is extended or adjusted under 35 U.S.C. 154(b) by 326 days.

(21) Appl. No.: 18/463,357

(22) Filed: Sep. 8, 2023

(65) Prior Publication Data
US 2024/0399943 A1    Dec. 5, 2024

(30) Foreign Application Priority Data
May 30, 2023   (CN) .......................... 202310635967.6

(51) Int. Cl.
*B60N 2/54* (2006.01)
*B60N 2/38* (2006.01)
(Continued)

(52) U.S. Cl.
CPC ............... *B60N 2/542* (2013.01); *B60N 2/38* (2013.01); *B60N 2/504* (2013.01);
(Continued)

(58) Field of Classification Search
CPC ........ B60N 2/542; B60N 2/502; B60N 2/504; A47C 1/03283; A47C 1/03288; A47C 1/03266
See application file for complete search history.

(56) References Cited

U.S. PATENT DOCUMENTS

| | | | | |
|---|---|---|---|---|
| 1,803,606 A | * | 5/1931 | Flintermann | B60N 2/502 267/140.3 |
| 2,949,153 A | * | 8/1960 | Hickman | B60N 2/502 248/575 |

(Continued)

FOREIGN PATENT DOCUMENTS

| | | |
|---|---|---|
| CN | 201720174176 U | 9/2017 |
| CN | 201710752289 A | 11/2017 |

(Continued)

*Primary Examiner* — Syed A Islam
(74) *Attorney, Agent, or Firm* — Minder Law Group; Willy H. Wong

(57) ABSTRACT

The present shock absorbing structure of an ATV seat for an ATV with a vehicle frame and a seat frame, comprising an elastic support member provided between the seat frame and the vehicle frame, the elastic support member supporting the seat frame and allowing the seat frame to move downward and compress the elastic support member when subjected to an external force. The shock absorbing structure further comprises at least one shock absorber block provided between the seat frame and the vehicle frame, the at least one shock absorber block being either attached to the seat frame and having a gap in an up-and-down direction from the vehicle frame, or attached to the vehicle frame and having a gap in the up-and-down direction from the seat frame. The present shock absorbing structure of an ATV seat provides overall enhanced comfort.

10 Claims, 8 Drawing Sheets

(51) Int. Cl.
*B60N 2/50* (2006.01)
*A47C 1/032* (2006.01)

(52) U.S. Cl.
CPC ...... *A47C 1/03283* (2013.01); *A47C 1/03288* (2013.01); *B60N 2/502* (2013.01)

(56) References Cited

U.S. PATENT DOCUMENTS

| | | | |
|---|---|---|---|
| 4,057,214 A * | 11/1977 | Harder, Jr. | ............. B60N 2/242 |
| | | | 248/634 |
| 6,879,261 B2 * | 4/2005 | Nishino | ............... B60N 2/0031 |
| | | | 340/665 |
| 7,533,924 B2 | 5/2009 | Ravid | |
| 8,556,341 B1 | 10/2013 | Connaughty | |
| 9,248,768 B2 | 2/2016 | Kolb | |
| 9,738,186 B2 | 8/2017 | Krueger | |
| 2010/0207416 A1 | 8/2010 | Inoue | |
| 2011/0298267 A1 | 12/2011 | Yamaki | |
| 2013/0038098 A1 | 2/2013 | Maier | |
| 2015/0231998 A1 | 8/2015 | Beier | |
| 2018/0215292 A1 | 8/2018 | Ochs | |

FOREIGN PATENT DOCUMENTS

| | | |
|---|---|---|
| CN | 202021341101 U | 4/2021 |
| WO | 2011111045 A2 | 9/2011 |
| WO | 2015097470 A1 | 7/2015 |

\* cited by examiner

SHOCK ABSORBING STRUCTURE OF AN ALL TERRAIN VEHICLE SEAT

RELATED APPLICATIONS

This application claims priority to Chinese Patent Application No. CN202310635967.6, filed May 30, 2023.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

TECHNICAL FIELD

The present invention pertains to the technical field of all terrain vehicles (ATVs), and relates to a shock absorbing structure of an all terrain vehicle seat for an ATV.

BACKGROUND

An ATV is a vehicle designed to traverse various terrains, offering superior maneuverability compared to conventional vehicles. In China, it is commonly referred to as a "dune buggy" due to its popularity for beach driving. Its structure and several components closely resemble those of a motorcycle, earning it the nickname "four-wheeled motorcycle". ATVs are highly versatile and not constrained by road conditions, enabling them to effortlessly traverse challenging terrains. However, this capability also exposes ATVs to significant jolts when operating on unpaved roads, necessitating careful consideration in their seat design.

An ATV seat is disclosed in Chinese patent application [Publication No.: CN107351733A], which comprises a seat baseplate, a soft cushion, and an underframe assembly. The soft cushion is provided on the seat baseplate, the seat baseplate is connected to a vehicle body frame of the ATV through the underframe assembly, and the seat baseplate is integrally molded by injection molding.

The aforementioned seat, as described in the prior art, relies solely on a soft cushion positioned on the seat's surface to absorb shocks during jolts experienced by the ATV. However, this design falls short in providing sufficient cushioning, making it challenging to meet the comfort requirements of users on various bumpy terrains.

SUMMARY

In view of the aforementioned problems in the prior art, the present invention provides a shock absorbing structure of an ATV seat. The objective is to solve the technical problem of inadequate comfort in existing ATV seats.

One objective of the present invention can be achieved by the following technical solution.

A shock absorbing structure of an all terrain vehicle seat for an all terrain vehicle with a vehicle frame and a seat frame, comprising an elastic support member provided between the seat frame and the vehicle frame, the elastic support member supporting the seat frame and allowing the seat frame to move downward and compress the elastic support member when subjected to an external force, the seat shock absorbing structure further comprises at least one shock absorber block provided between the seat frame and the vehicle frame, the at least one shock absorber block being either attached to the seat frame and having a gap in an up-and-down direction from the vehicle frame, or attached to the vehicle frame and having a gap in the up-and-down direction from the seat frame.

In one embodiment of the above shock absorbing structure of an ATV seat, an elastic modulus of the at least one shock absorber block is greater than an elastic modulus of the elastic support member.

In some embodiments of the above shock absorbing structure of an ATV seat, a front end of the seat frame is hingedly engaged with the vehicle frame, and the at least one shock absorber block is disposed close to a rear end of the seat frame.

In some embodiments of the above shock absorbing structure of an ATV seat, the at least one shock absorber block has an accommodating recess extending on a bottom surface of the at least one shock absorber block and through both left and right sides of the at least one shock absorber block, the shock absorbing structure further comprises: a locking rod provided on the vehicle frame along a left-and-right direction, the locking rod being located in the accommodating recess and being limited in a front-and-rear direction by engagement with an inner wall of the accommodating recess; and a locking hook capable of swinging in the front-and-rear direction and attached to the rear end of the seat frame, the locking hook being hooked to the locking rod and being vertically limited by engagement with a lower side of the locking rod.

In some embodiments of the above shock absorbing structure of an ATV seat, the shock absorbing structure further comprises an accommodating carrier fixedly connected to a bottom of the seat frame and having a downwardly facing opening, the at least one shock absorber block being embedded and connected inside the accommodating carrier and partially protruding beyond the opening of the accommodating carrier.

In some embodiments of the above shock absorbing structure of an ATV seat, the accommodating carrier has a positioning notch located on both left and right sidewalls of the accommodating carrier and positioned correspondingly to the accommodating recess, an arched top of the positioning notch being disposed around a periphery of the accommodating recess.

In some embodiments of the above shock absorbing structure of an ATV seat, a spring member is provided between the locking hook and the seat frame, so that the locking hook always has a tendency to be hooked to the locking rod under an action of the spring member.

In some embodiments of the above shock absorbing structure of an ATV seat, at least two of the at least one shock absorber blocks are provided and arranged on both left and right sides of the seat frame respectively.

In some embodiments of the above shock absorbing structure of an ATV seat, the elastic support member is provided at both front and rear sides of each of the at least one shock absorber blocks.

In some embodiments of the above shock absorbing structure of an ATV seat, the locking hook is disposed close to the at least one shock absorber block in the left-and-right direction.

Compared to the prior art, the present invention has the following advantages:

The present shock absorbing structure of an ATV seat efficiently absorbs minor jolts through substantial deformation of the elastic support members, effectively minimizing the transfer of force to an occupant; in situations where significant jolts occur, the at least one shock absorber block and the elastic support members collaborate to absorb and dampen impact loads in stages, within a limited range of seat frame movement, preventing any rigid collision between the seat frame and the vehicle frame, ensuring a continuous and ample cushioning experience for the occupant, and remarkably enhancing overall comfort of the seat.

DETAILED DESCRIPTION

Set forth below are specific embodiments of the present invention and a further description of the technical solutions of the present invention in conjunction with the accompanying drawings, but the present invention is not limited to these embodiments.

Embodiment I

Figure 1:
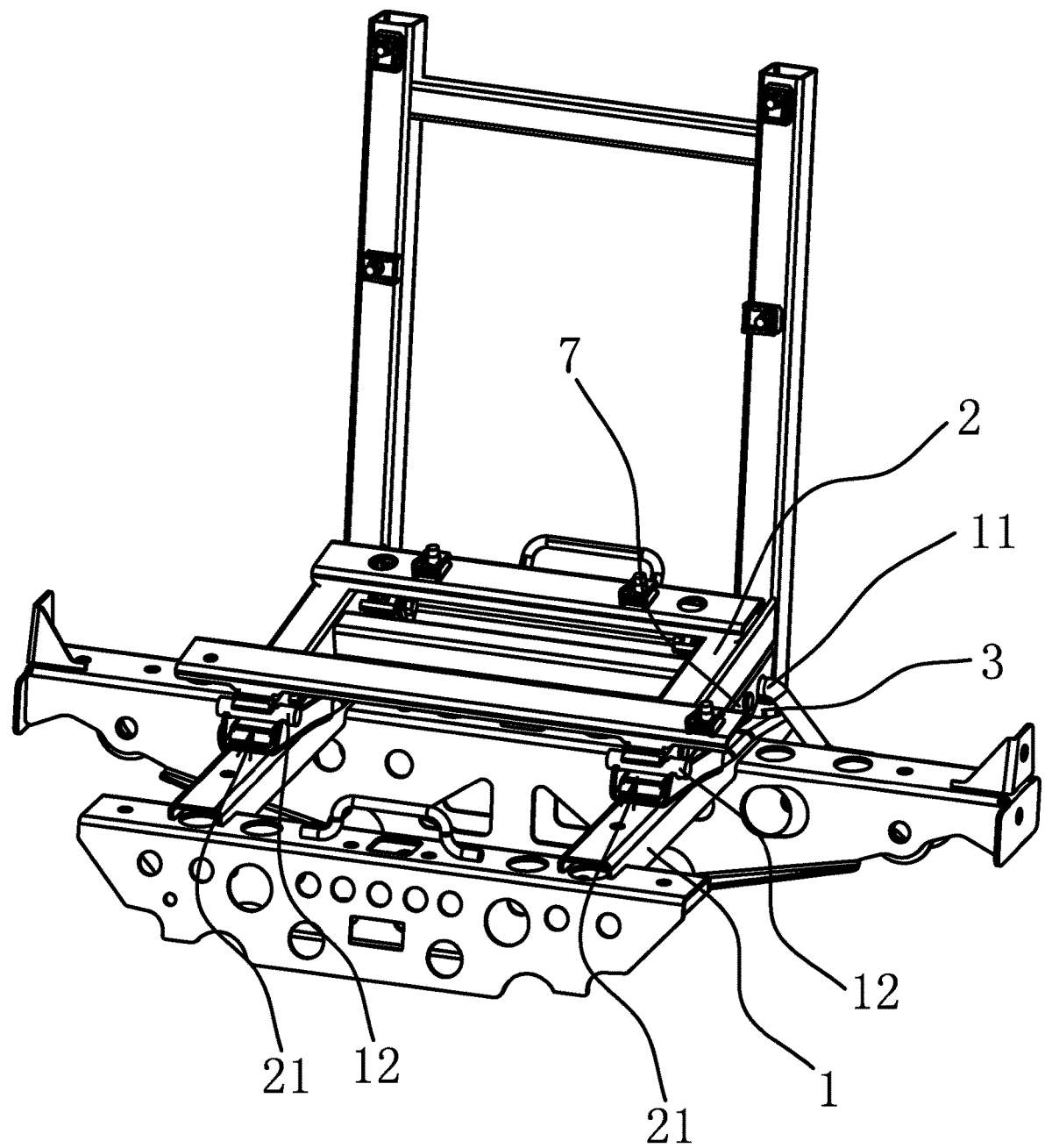
FIG. 1 is a first perspective view of Embodiment I of a shock absorbing structure of an all terrain vehicle seat.
Figure 2:
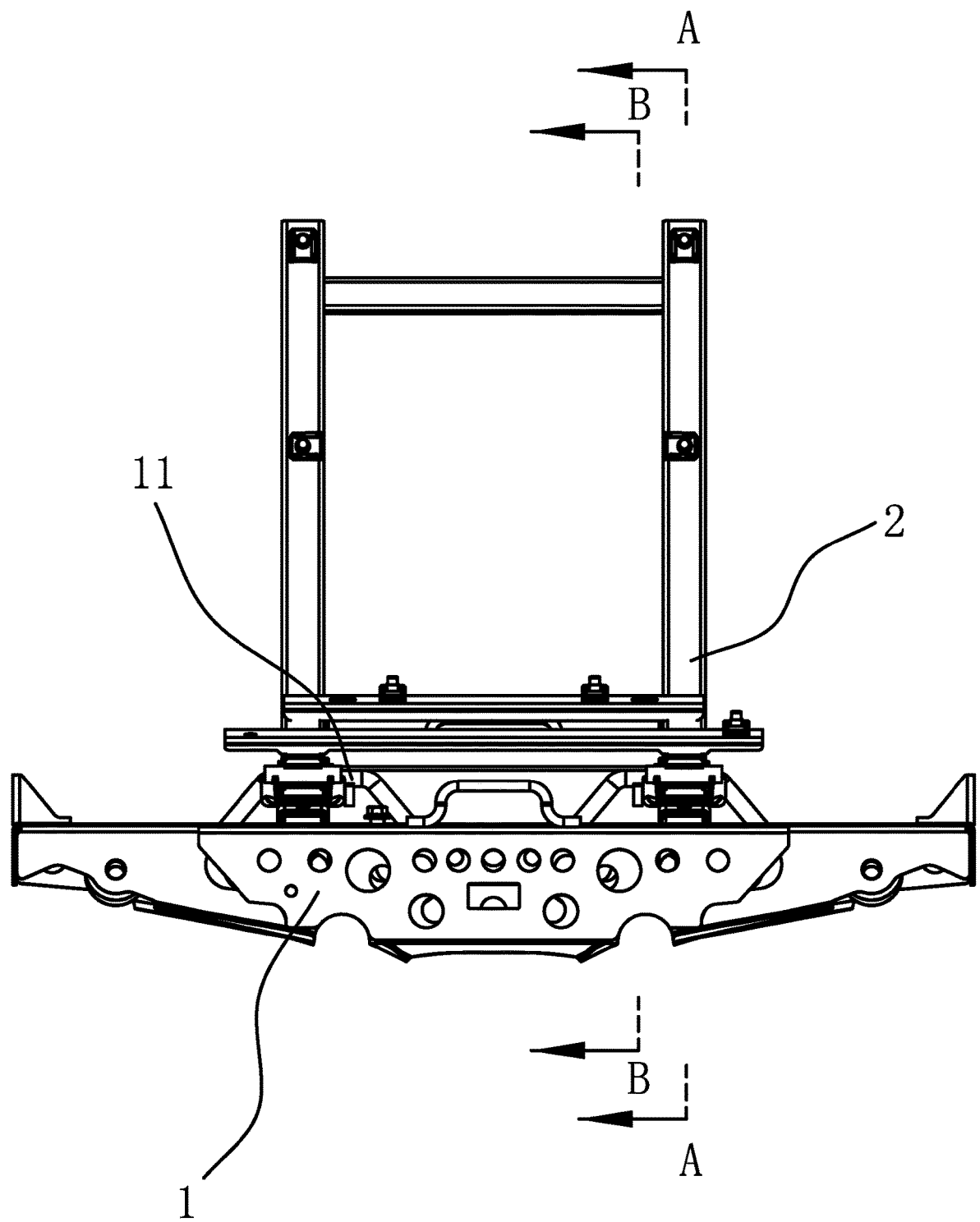
FIG. 2 is a front view of Embodiment I.
Figure 3:
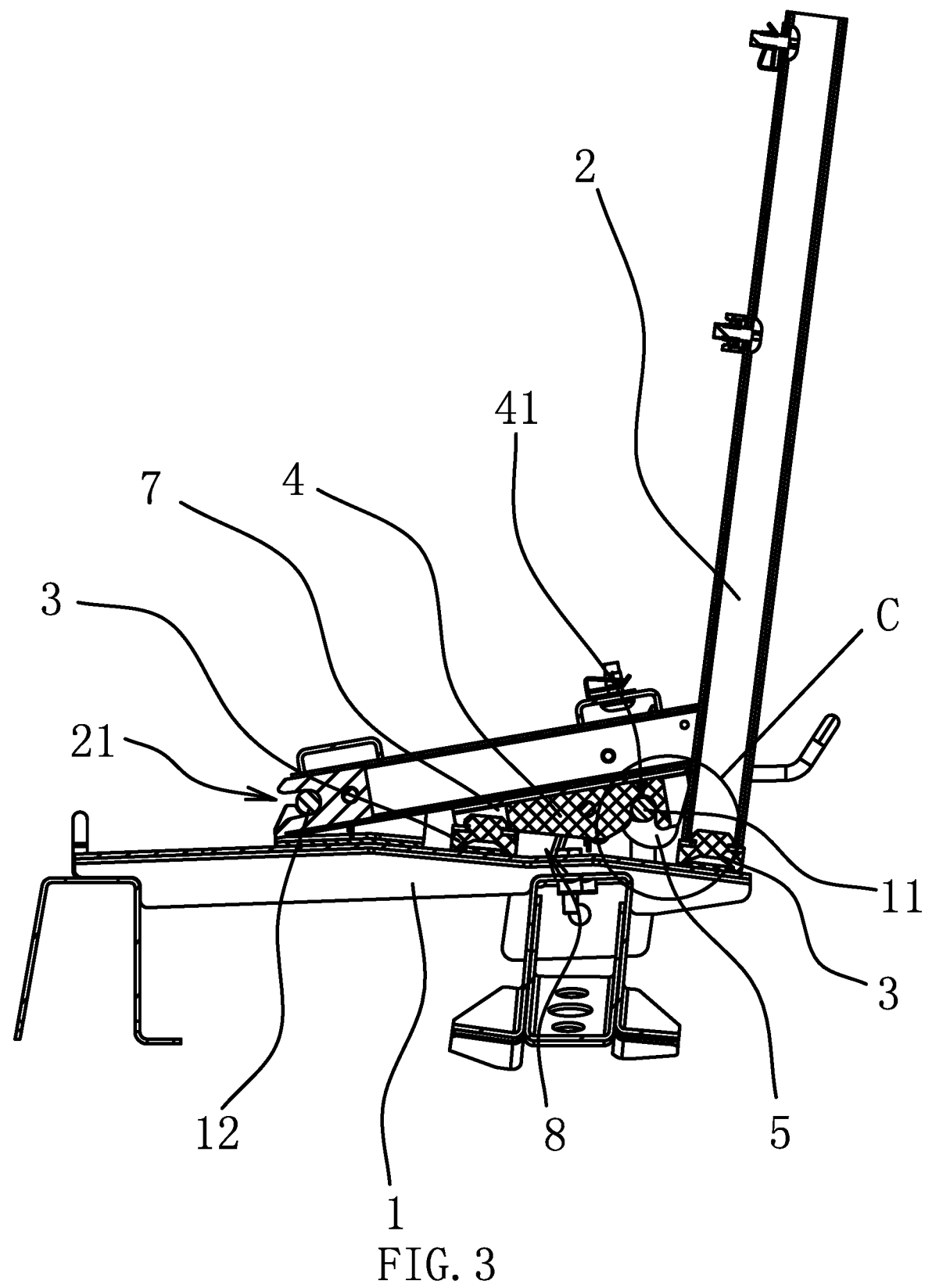
FIG. 3 is a cross-sectional view along line A-A in FIG. 2.

As shown in FIGS. 1 and 2, in an embodiment of a shock absorbing structure of an ATV seat in accordance with the present invention, the ATV comprises a vehicle frame 1 and a seat frame 2, and as shown in FIG. 3, the shock absorbing structure comprises an elastic support member 3, which is cylindrical and made of a soft elastic material like rubber. The elastic support member 3 is positioned between the seat frame 2 and the vehicle frame 1, with its upper and lower ends applying force to the seat frame 2 and the vehicle frame 1, respectively. The vehicle frame 1 serves as a primary frame for mounting and supporting the vehicle body, while the seat frame 2 supports both the seat and weight of an occupant and ensures a desired shape of the seat. By placing the elastic support member 3 between the seat frame 2 and the vehicle frame 1, the upper and lower ends of the elastic support member 3 apply force to the seat frame 2 and the vehicle frame 1, respectively. The seat frame 2 is connected to the vehicle frame 1 to prevent detachment but allows for slight up-and-down movement. In other words, the elastic support member 3 initially deforms to offer support to the seat frame 2, preventing the seat frame 2 from moving closer to the vehicle frame 1. When the occupant experiences jolts, impact loads applied to the seat frame 2 are dissipated and transferred through compression and deformation of the elastic support member 3, effectively avoiding rigid contact between the seat frame 2 and the vehicle frame 1. Consequently, this shock absorbing structure effectively minimizes the transfer of force to the occupant by absorbing minor jolts through substantial deformation of the elastic support member 3, ultimately improving seat comfort.

Figure 4:
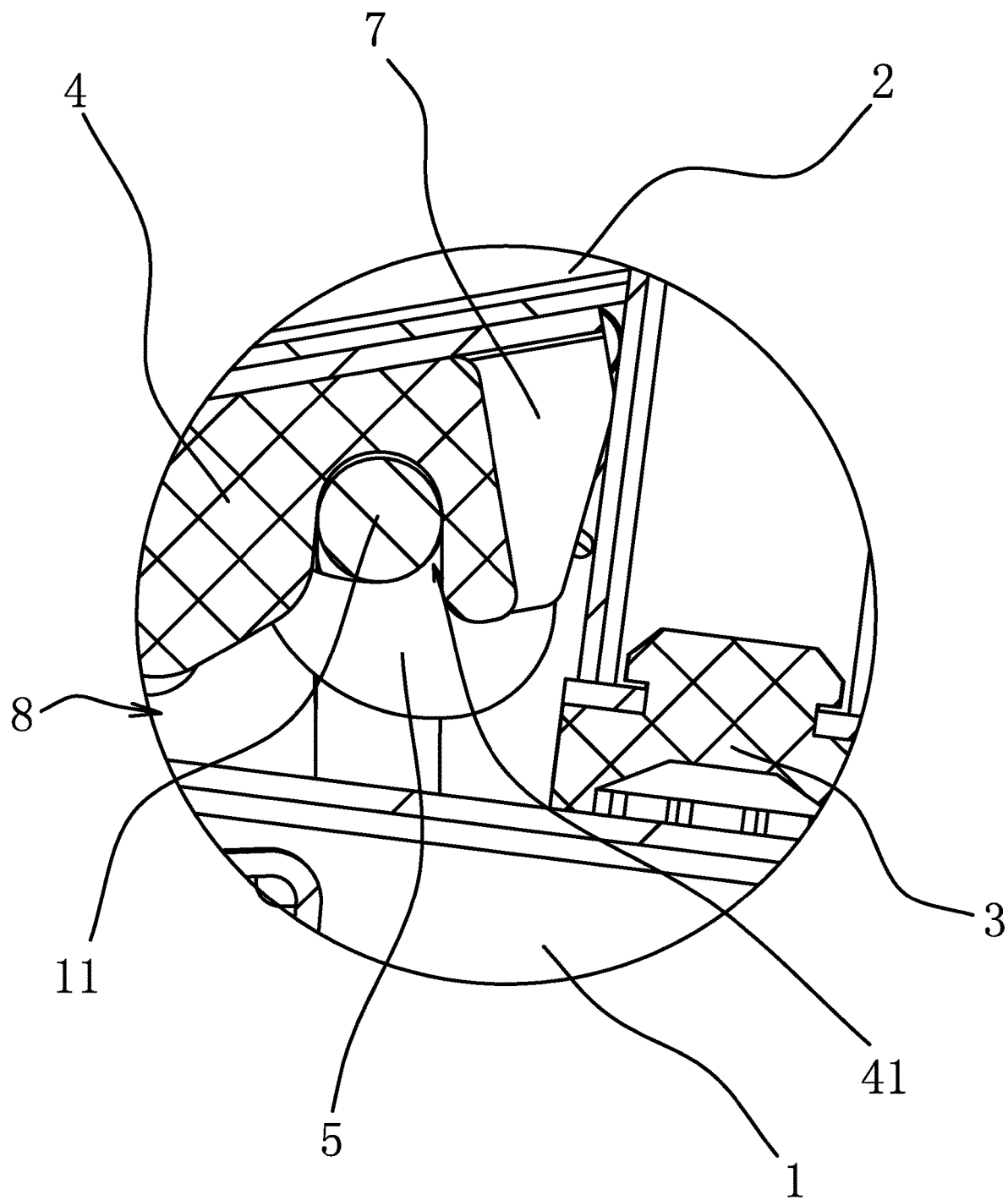
FIG. 4 is an enlarged view of an area C in FIG. 3.

As shown in FIGS. 3 and 4, the shock absorbing structure further comprises at least one shock absorber block 4 made of plastic. The at least one shock absorber block 4 is connected to a bottom of the seat frame 2 while maintaining a certain clearance from the vehicle frame 1, that is, there exists a gap 8 between the at least one shock absorber block 4 and the vehicle frame 1 in an up-and-down direction. When the seat frame 2 is subjected to an external force, the at least one shock absorber block 4 moves downward in sync with the seat frame 2 toward the vehicle frame 1 until contact is made. In situations where significant jolts occur, the occupant experiences downward movement, causing the elastic support member 3 to compress and deform even further. Consequently, the gap 8 at the location of the at least one shock absorber block 4 is eliminated. From this point, the at least one shock absorber block 4 generates an elastic force that is applied to both the vehicle frame 1 and the seat frame 2 in the up-and-down direction. In this way, the at least one shock absorber block 4 collaborates with the elastic support member 3 to absorb and mitigate additional impact loads through compression and deformation. In other words, when the elastic support member 3 undergoes significant compression and deformation, the at least one shock absorber block 4 comes into play and work in conjunction with the elastic support member 3 to further absorb impact loads through compression and deformation. Therefore, in situations where significant jolts occur, this collaboration between the at least one shock absorber block 4 and the elastic support member 3 ensures a staged absorption and damping of impact loads within a limited range of movement of the seat frame 2, effectively preventing any rigid collision between the seat frame 2 and the vehicle frame 1, guaranteeing a continuous and ample cushioning experience for the occupant during jolts, and remarkably enhancing the overall comfort of the seat.

Specifically, the at least one shock absorber block 4 has a higher elastic modulus than an elastic modulus of the elastic support member 3. This means that the at least one shock absorber block 4 is capable of absorbing a greater amount of load and energy per unit of its deformative displacement when interacting with the vehicle frame 1. In other words, the at least one shock absorber block 4 ensures comfort of the seat while effectively preventing the seat frame 2 from making rigid contact with the vehicle frame 1 in a downward motion.

Figure 5:
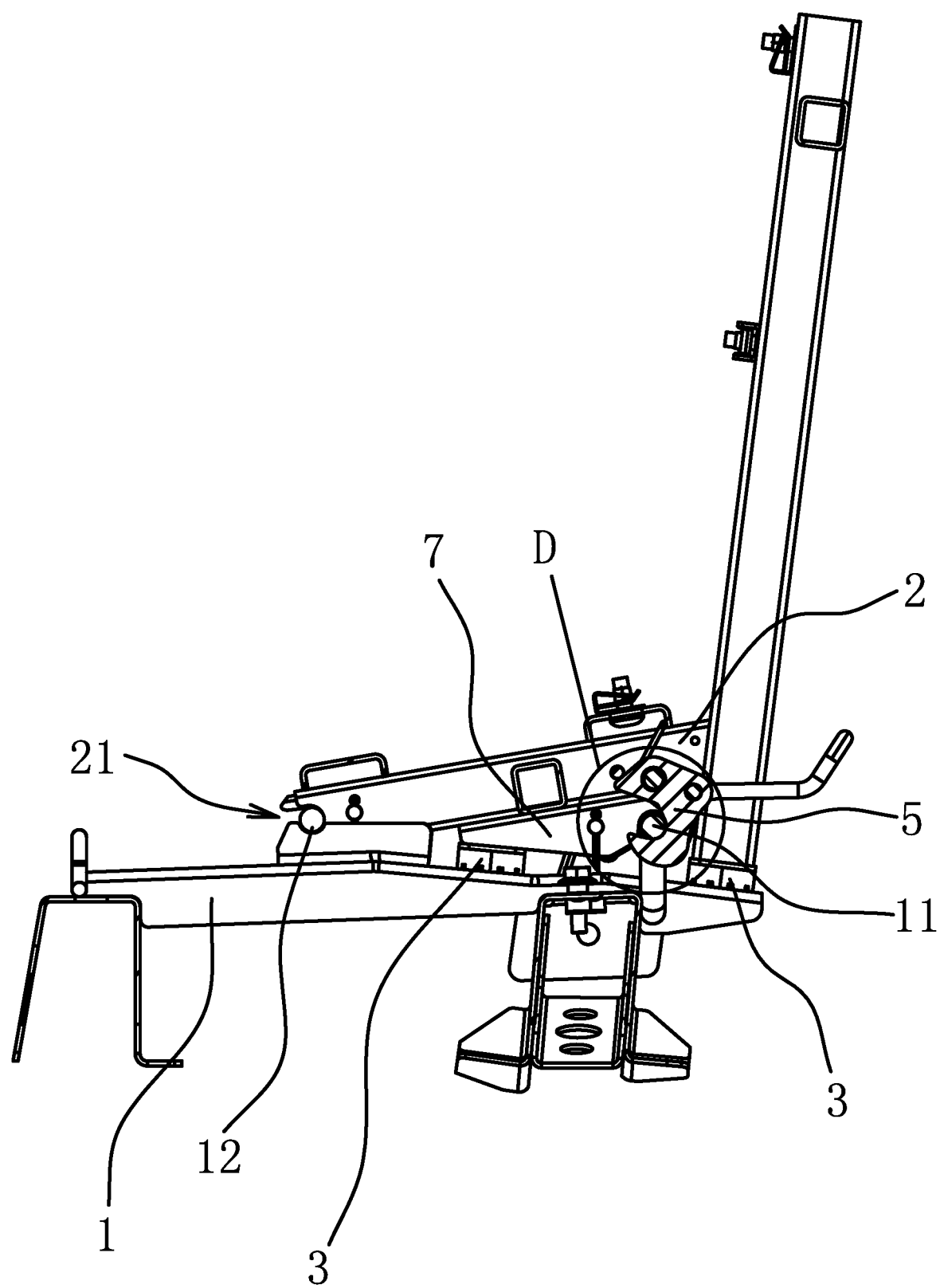
FIG. 5 is a cross-sectional view along line B-B in FIG. 2.
Figure 6:
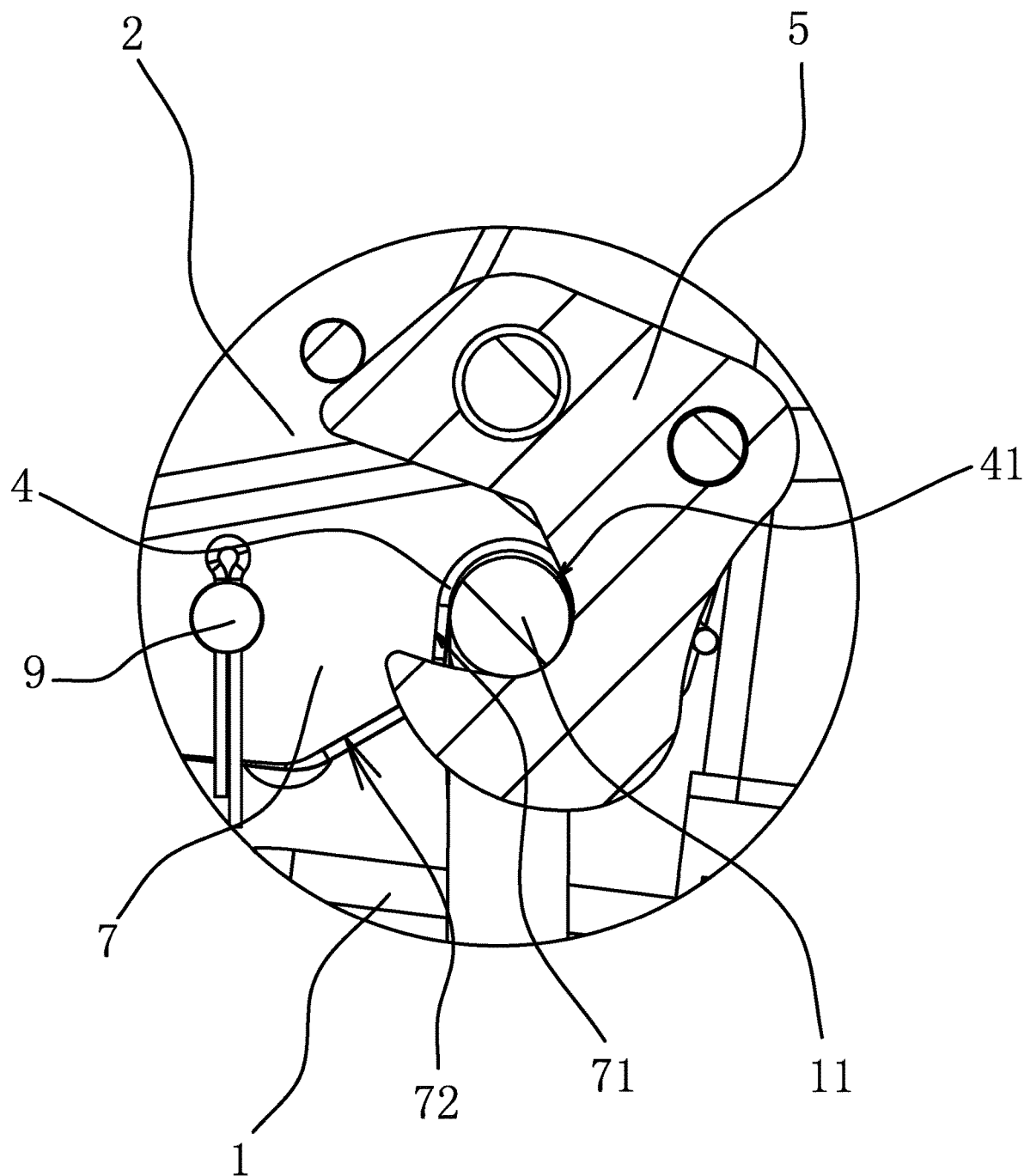
FIG. 6 is an enlarged view of an area D in FIG. 5.

As shown in FIG. 3, a front end of the seat frame 2 is hingedly engaged with the vehicle frame 1. Specifically, the front end of the seat frame 2 has a positioning recess 21, while a positioning shaft 12 is transversely provided on the vehicle frame 1 in a left-and-right direction and embedded in the positioning recess 21 to form a hinged engagement. The at least one shock absorber block 4 is provided near a rear end of the seat frame 2. This design allows the seat frame 2 to pivot up-and-down around the hinged position at its front end when moving relative to the vehicle frame 1, in other words, the seat's movement is concentrated at its rear end, providing an increased cushioning range for the occupant's hip during jolts and ultimately enhancing comfort. Referring to FIG. 4, the at least one shock absorber block 4 has an accommodating recess 41 extending on a bottom surface of the at least one shock absorber block 4 and through both left and right sides of the at least one shock absorber block, and a locking rod 11 is provided on the vehicle frame 1 along the left-and-right direction, the locking rod being located in the accommodating recess 41 and being limited in a front-and-rear direction by engagement with an inner wall of the accommodating recess 41. Referring to FIGS. 5 and 6, a locking hook 5, capable of swinging in the front-and-rear direction, is connected to the rear end of the seat frame 2, the locking hook 5 being hooked to the locking rod 11 and being vertically limited by engagement with a lower side of the locking rod 11. As a result, the locking rod 11 and the at least one shock absorber block 4 mutually restrict each other during their interaction, ensuring a stable relative position between them during jolts. In addition, a relative movement between the inner wall of the accommodating recess 41 and the locking rod 11 generates friction, further damping the amount of jolt energy transferred to the seat frame 2. Moreover, the engagement between the locking hook 5 and the locking rod 11 ensures a stable connection between the seat frame 2 and the vehicle frame 1, preventing the seat frame 2 from detaching in an upward motion. Furthermore, the locking hook 5 and the accommodating recess 41 cooperates to enclose the locking rod 11 along its outer circumferential surface, with both the locking hook 5 and the at least one shock absorber block 4 surrounding the locking rod 11. This design ensures cushioning when the seat frame 2 moves forward, backward, or downward in relation to the vehicle frame 1, providing comfort; in situations where upward jolts occur, as the seat frame 2 moves upward relative to the vehicle frame 1 to a certain extent, the locking hook 5 comes into rigid contact with the locking rod 11 and swiftly dissipates the impact energy, while the occupant's simultaneous upward jolting does not result in discomfort during this process, facilitating rapid dissipation of jolt energy and preventing repeated deformation and energy absorption of the elastic support member 3 and the at least one shock absorber block 4 following significant jolting impacts, thereby improving comfort.

Figure 7:
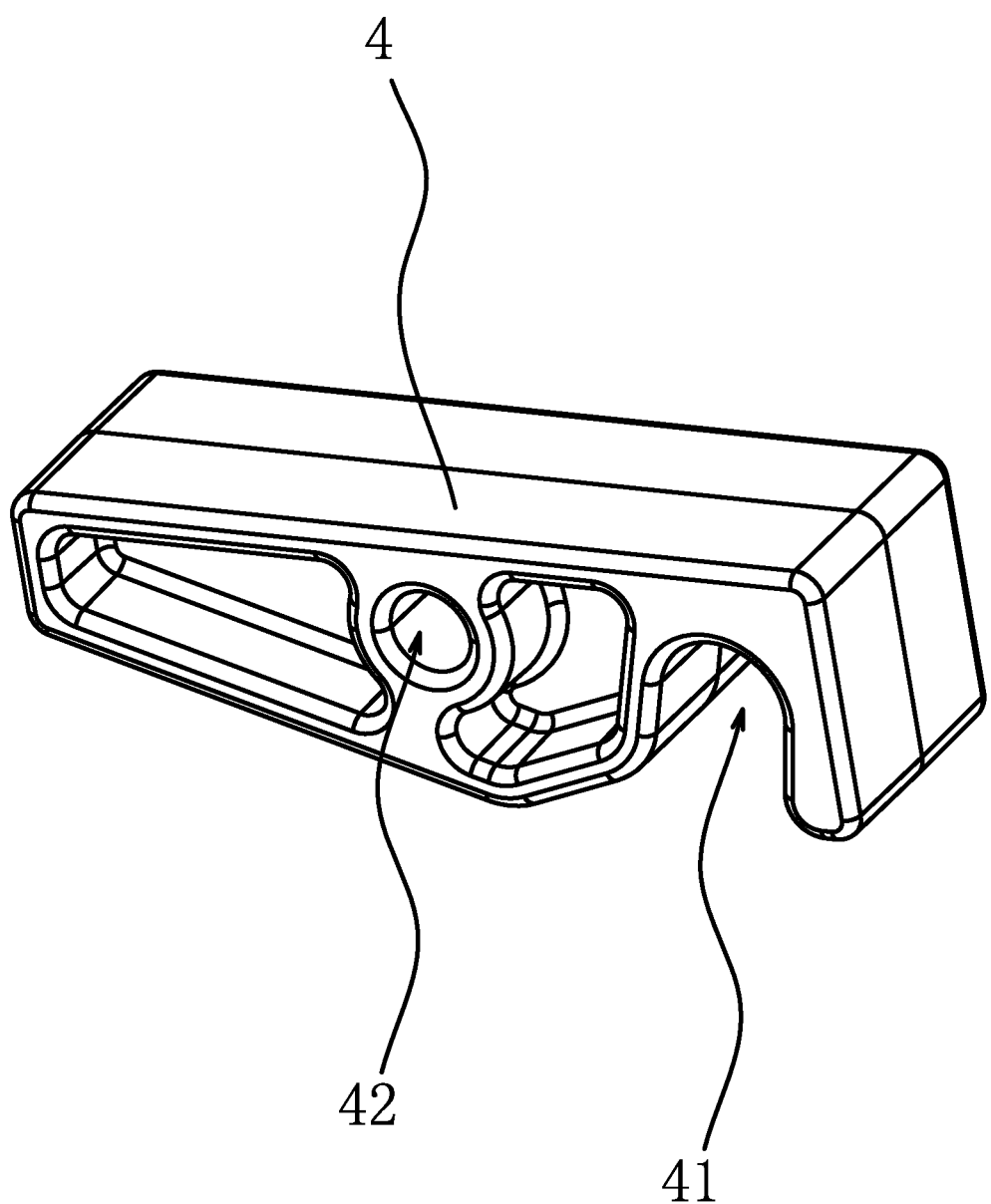
FIG. 7 is a perspective view of a shock absorber block of Embodiment I.

As shown in FIGS. 3 and 4, an accommodating carrier 7 having a downwardly facing opening 72 is fixedly connected to a bottom of the seat frame 2, and as shown in FIG. 6, the at least one shock absorber block 4 is embedded and connected inside the accommodating carrier 7 and partially protrudes beyond the opening 72 of the accommodating carrier 7. With this arrangement, the accommodating carrier 7 provides confinement for the at least one shock absorber block 4, ensuring that the at least one shock absorber block 4 remains securely positioned and resist shifting during compression. As a result, this not only indirectly increases the elastic modulus of the at least one shock absorber block 4, but also allows for the use of a same material for both the at least one shock absorber block 4 and the elastic support member 3, achieving cost savings while ensuring comfort. As shown in FIGS. 3, 6, and 7, a middle part of the at least one shock absorber block 4 has a through hole 42 that extends along the left-and-right direction, and a positioning rod 9 is inserted into the through hole 42, with two ends of the positioning rod 9 extending beyond the through hole 42 and inserted into the left and right sidewalls of the accommodating carrier 7.

Figure 8:
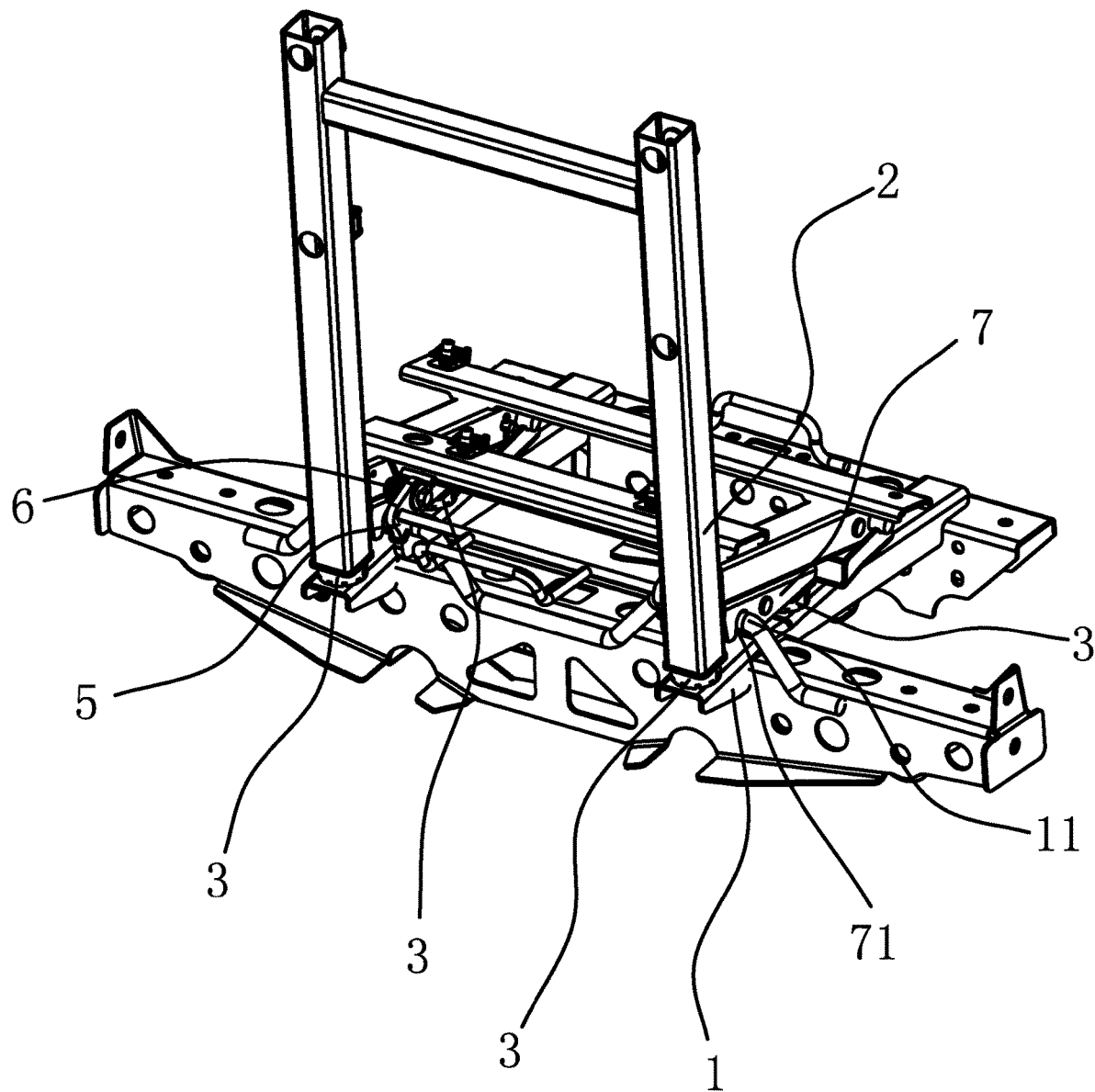
FIG. 8 is a second perspective view of Embodiment I.

As shown in FIGS. 6 and 8, the accommodating carrier 7 has a positioning notch 71 located on both left and right sidewalls of the accommodating carrier 7 and positioned correspondingly to the accommodating recess 41, an arched top of the positioning notch 71 being disposed around a periphery of the accommodating recess 41. That is, as shown in FIG. 6, a portion of the at least one shock absorber block 4 at the location of the accommodating recess 41 protrudes beyond a bottom surface of the positioning notch 71. Hence, in extreme situations where jolt loads are very high, the at least one shock absorber block 4 undergoes significant compression, causing the arched top of the positioning notch 71 to come into contact with the locking rod 11, thereby protecting the at least one shock absorber block 4 and ensuring its service life. In this embodiment, two shock absorber blocks 4 are provided arranged on the left and right sides of the seat frame 2, respectively, providing support and cushioning on both the left and right sides of the seat frame 2, thereby ensuring comfort and stability in the middle part of the seat frame 2. The elastic support member 3 is arranged at both front and rear sides of each of the two shock absorber blocks 4. Therefore, during a deformation process of the two shock absorber blocks 4, the elastic support members 3 arranged on both the front and rear sides of each of the two shock absorber blocks 4 have similar elastic modulus, a uniform distributed elastic modulus is achieved at the bottom of the seat frame 2, and as a result, perceived load feedback positions of the seat frame 2 for the occupant remain consistent at different stages.

As shown in FIG. 8, a spring member 6, which is a torsion spring in this embodiment, is provided between the locking hook 5 and the seat frame 2, so that the locking hook 5 always has a tendency to be hooked to the locking rod 11 under an action of the spring member 6. The locking hook 5 is hinged to the seat frame 2 via a pivot shaft, and the torsion spring is sleeved on the pivot shaft, with one end of the torsion spring being fixed to the locking hook 5, while the other end of the torsion spring being fixed to the seat frame 2. This helps maintain the locking hook 5 and the locking rod 11 in an engaged state during jolts, ensuring stability of the seat frame 2, and at the same time, the spring member 6 continuously absorbs and dissipates jolt energy during jolts, reducing magnitude of repetitive jolts. Further, the locking hook 5 is arranged close to the at least one shock absorber block 4 in the left-and-right direction. This facilitates the locking hook 5 and the accommodating recess 41 to cooperate to form a more effective closed loop constraint on the outer circumferential surface of the locking rod 11, thereby reducing the impact of any deflection or bending of the locking rod 11 on the seat's cushioning effect. In this embodiment, two said locking hooks 5 are provided and arranged in the left-and-right direction near the two shock absorber blocks 4 respectively, and are controlled to swing by the same connecting rod. The two locking hooks 5 are located between the two accommodating carriers 7.

Embodiment II

This embodiment closely resembles Embodiment I, but with a few differences as follows: the at least one shock absorber block 4 is now attached to the vehicle frame 1, and there exists a gap 8 between the at least one shock absorber block 4 and the seat frame 2 in the up-and-down direction. As a result, certain components originally situated on the seat frame 2 in Embodiment I (such as the accommodating carrier 7, the locking hooks 5, and the spring members 6, etc.) may now be correspondingly positioned on the vehicle frame 1; likewise, certain components originally situated on the vehicle frame 1 in Embodiment I (such as the locking rod 11 and the positioning shaft 12, etc.) may now be correspondingly positioned on the seat frame 2.

The specific embodiments described herein are merely illustrative examples of the spirit of the present invention. A person skilled in the art to which the present invention pertains can make various modifications or supplementations to the specific embodiments described above, or adopt similar approaches, without departing from the spirit of the present invention or going beyond the scope defined by the appended claims.

REFERENCED PARTS 1 vehicle frame
11 locking rod
12 positioning shaft 2 seat frame
21 positioning recess
3 elastic support member
4 shock absorber block
41 accommodating recess
42 through hole
5 locking hook
6 spring member
7 accommodating carrier
71 positioning notch
72 opening
8 gap
9 positioning rod

What is claimed is:

1. A shock absorbing structure of an all terrain vehicle seat for an all terrain vehicle with a vehicle frame and a seat frame, the shock absorbing structure comprising:
an elastic support member provided between the seat frame and the vehicle frame, the elastic support member supporting the seat frame and allowing the seat frame to move downward and compress the elastic support member when subjected to an external force, the shock absorbing structure further comprises at least one shock absorber block provided between the seat frame and the vehicle frame, the at least one shock absorber block being either attached to the seat frame and having a gap in an up-and-down direction from the vehicle frame, or attached to the vehicle frame and having a gap in the up-and-down direction from the seat frame.

2. The shock absorbing structure of an all terrain vehicle seat as claimed in claim 1, wherein an elastic modulus of the at least one shock absorber block is greater than an elastic modulus of the elastic support member.

3. The shock absorbing structure of an all terrain vehicle seat as claimed in claim 1, wherein a front end of the seat frame is hingedly engaged with the vehicle frame, and the at least one shock absorber block is disposed close to a rear end of the seat frame.

4. The shock absorbing structure of an all terrain vehicle seat as claimed in claim 1, wherein the at least one shock absorber block has an accommodating recess extending on a bottom surface of the at least one shock absorber block and through both left and right sides of the at least one shock absorber block, the shock absorbing structure further comprises: a locking rod provided on the vehicle frame along a left-and-right direction, the locking rod being located in the accommodating recess and being limited in a front-and-rear direction by engagement with an inner wall of the accommodating recess; and a locking hook capable of swinging in the front-and-rear direction and attached to the rear end of the seat frame, the locking hook being hooked to the locking rod and being vertically limited by engagement with a lower side of the locking rod.

5. The shock absorbing structure of an all terrain vehicle seat as claimed in claim 4, wherein the shock absorbing structure further comprises an accommodating carrier fixedly connected to a bottom of the seat frame and having a downwardly facing opening, the at least one shock absorber block being embedded and connected inside the accommodating carrier and partially protruding beyond the opening of the accommodating carrier.

6. The shock absorbing structure of an all terrain vehicle seat as claimed in claim 5, wherein the accommodating carrier has a positioning notch located on both left and right sidewalls of the accommodating carrier and positioned correspondingly to the accommodating recess, an arched top of the positioning notch being disposed around a periphery of the accommodating recess.

7. The shock absorbing structure of an all terrain vehicle seat as claimed in claim 4, wherein a spring member is provided between the locking hook and the seat frame, so that the locking hook always has a tendency to be hooked to the locking rod under an action of the spring member.

8. The shock absorbing structure of an all terrain vehicle seat as claimed in claim 1, wherein at least two of the at least one shock absorber block are provided and arranged on both left and right sides of the seat frame respectively.

9. The shock absorbing structure of an all terrain vehicle seat as claimed in claim 8, wherein the elastic support member is provided at both front and rear sides of each of the at least one shock absorber blocks.

10. The shock absorbing structure of an all terrain vehicle seat as claimed in claim 4, wherein the locking hook is disposed close to the at least one shock absorber block in the left-and-right direction.

* * * * *

UNITED STATES PATENT AND TRADEMARK OFFICE
CERTIFICATE OF CORRECTION

PATENT NO. : 12,459,408 B2  
APPLICATION NO. : 18/463357  
DATED : November 4, 2025  
INVENTOR(S) : Weiwei Lin, Dongdong Chen and Mengda Yang Page 1 of 1

It is certified that error appears in the above-identified patent and that said Letters Patent is hereby corrected as shown below:

On the Title Page

Item (73) The Assignee Name:  
Zhejiang Qianlang Motorcycle Co., Ltd.  
Should read:  
Zhejiang Qianjiang Motorcycle Co., Ltd.

Signed and Sealed this  
Twentieth Day of January, 2026

John A. Squires  
*Director of the United States Patent and Trademark Office*